US010828778B2

(12) United States Patent
Zhang et al.

(10) Patent No.: US 10,828,778 B2
(45) Date of Patent: Nov. 10, 2020

(54) METHOD FOR OPERATING A ROBOT

(71) Applicant: ABB Schweiz AG, Baden (CH)

(72) Inventors: Biao Zhang, West Hartford, CT (US); Xiongzi Li, West Hartford, CT (US); George Q. Zhang, Windsor, CT (US)

(73) Assignee: ABB Schweiz AG, Baden (CH)

( * ) Notice: Subject to any disclaimer, the term of this patent is extended or adjusted under 35 U.S.C. 154(b) by 223 days.

(21) Appl. No.: 15/827,334

(22) Filed: Nov. 30, 2017

(65) Prior Publication Data
US 2019/0160678 A1 May 30, 2019

(51) Int. Cl.
*B25J 9/16* (2006.01)
(52) U.S. Cl.
CPC ............ *B25J 9/1671* (2013.01); *B25J 9/163* (2013.01); *B25J 9/1638* (2013.01); *B25J 9/1664* (2013.01)
(58) Field of Classification Search
CPC ........ B25J 9/1671; B25J 9/163; B25J 9/1638; B25J 9/1664; B25J 9/16; B25J 9/1674; B25J 9/2676; G05B 2219/39067; G05B 2219/33297; G05B 2219/35283; G05B 2219/39102; G05B 2219/39536
USPC ........ 700/245, 217, 249, 252, 257; 318/560, 318/567, 573, 574; 73/619
See application file for complete search history.

(56) References Cited

U.S. PATENT DOCUMENTS

| 4,605,354 | A | 8/1986 | Daly |
| 6,230,079 | B1 * | 5/2001 | Brogårdh ............... B25J 9/1628 700/260 |
| 6,678,581 | B2 | 1/2004 | Hung et al. |
| 7,551,979 | B2 | 6/2009 | Saraliev |
| 9,085,083 | B2 | 7/2015 | Nixon |
| 9,694,494 | B1 | 7/2017 | Stubbs et al. |
| 2007/0021868 | A1 * | 1/2007 | Nagatsuka ............ B25J 9/1674 700/245 |
| 2009/0043425 | A1 | 2/2009 | Ito et al. |

(Continued)

FOREIGN PATENT DOCUMENTS

WO    2006117022    11/2006

OTHER PUBLICATIONS

International Search Report and Written Opinion, PCT Appln. No. PCT/US2018/63286, 12 pgs.

*Primary Examiner* — Dalena Tran
(74) *Attorney, Agent, or Firm* — Taft Stettinius & Hollister LLP; J. Bruce Schelkopf

(57) ABSTRACT

A method for operating a robot includes: creating a production robot program for execution on a robotic controller, wherein the robot program defines a robot path; performing an offline simulation of robot motion along the robot path using the production robot program; analyzing loads between a robot end effector and an object along the robot path, based on the offline simulation, to identify a maximum load experienced during the simulation; tuning production robot program parameters to reduce the maximum load if the maximum load is not within a predefined limit; generating a test robot program to test the end effector and the object with the maximum load within the predefined limit; testing the end effector with the object online using the test robot program; repeating the tuning and testing until no objects are dropped during the testing; and operating the robot during production using tuned robot program parameters.

20 Claims, 7 Drawing Sheets

(56) References Cited

U.S. PATENT DOCUMENTS

| | | | |
|---|---|---|---|
| 2011/0106308 A1* | 5/2011 | Eliasson | B25J 9/1664 |
| | | | 700/250 |
| 2012/0123590 A1 | 5/2012 | Halsmer | |
| 2017/0036354 A1 | 2/2017 | Chavan Dafle et al. | |
| 2017/0193137 A1 | 7/2017 | Li et al. | |

* cited by examiner

FIG. 5

METHOD FOR OPERATING A ROBOT

TECHNICAL FIELD

The present application generally relates to robotics, and more particularly, but not exclusively, to methods for operating a robot

BACKGROUND

Robotic systems remain an area of interest. Some existing systems have various shortcomings, drawbacks and disadvantages relative to certain applications. For example, in some robotic systems, load data available for selecting or designing a robot gripper for picking and moving objects in a dynamic environment may be improved. Accordingly, there remains a need for further contributions in this area of technology.

SUMMARY

Some embodiments include unique methods for operating a robot. Other embodiments include apparatuses, systems, devices, hardware, methods, and combinations for operating a robot. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIG. 5 illustrates some aspects of a non-limiting example of a display of calculated torque/moment in accordance with an embodiment of the present invention.

DETAILED DESCRIPTION OF THE ILLUSTRATIVE EMBODIMENTS

Figure 1:
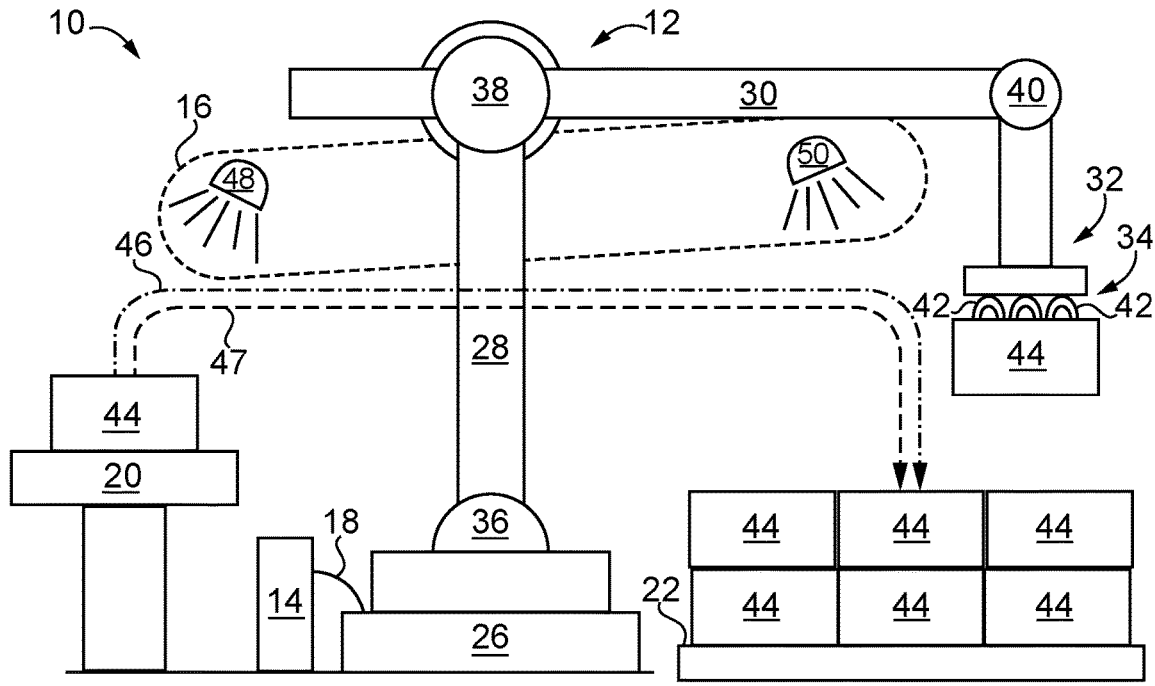
FIG. 1 schematically illustrates some aspects of a non-limiting example of a robotic system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a robotic system 10 in accordance with an embodiment of the present invention are schematically depicted. Robotic system 10 includes a robot 12, a computer-based robotic controller 14 and a robotic vision system 16. Controller 14 is communicatively coupled to robot 12 via a communications link 18, e.g., a two-way communications link, which may be a wired, wireless or optical connection. Controller 14 is operative to execute program instructions to control the operations of robot 12, and to receive data from vision system 16 for use in controlling robot 12.

In one form, robotic system 10 is a palletizing robotic system operative to retrieve or pick objects from an infeed conveyor 20, and transport the objects to a pallet 22, and deposit or place the objects onto pallet 22, and in some embodiments, to pack objects. In other embodiments, the objects may be picked from a bin or other contrivance. In some embodiments, the objects may be deposited onto a conveyor or other apparatus or other container or surface. During the palletizing operations, vision system 16 is used to acquire images of the objects to be picked up by robot 12 and provide location information as to where to deposit the objects on pallet 22.

Robot 12 includes a base 26, a lower arm 28, an upper arm 30 and an end effector 32, e.g., including or carrying a tool. In one form, robot 12 is a 6-axis robot. In other embodiments, robot 12 may have a greater or lesser number of axes. Lower arm 28 is coupled to base 26 via a shoulder joint system 36. Upper arm 30 is coupled to lower arm 28 via an elbow joint 38. End effector 32 is coupled to upper arm 30 via a wrist joint 40.

In one form, end effector 32 is or includes a gripper 34. In one form, gripper 34 is a vacuum gripper having a plurality of vacuum powered suction cups 42 configured to pick up objects 44 from infeed conveyor 20. Objects 44 may be, for example, packages, slip sheets, bags, crates, parts or other objects. In one example, gripper 34 includes nine suction cups 42 arranged in a 3×3 grid. In other embodiments, suction cups 42 may be arranged in any suitable geometric configuration. The number of suction cups 42 in gripper 34 may vary with the needs of the application. In other embodiments, other forms of grippers or other types of end effectors may be employed. During operation, robot 12, picks an object 44 up from a first location (e.g., infeed conveyor 20) using end effector 32, e.g., gripper 34, and transports the object 44 along a robot path 46 to deposit or place the part at a second location, e.g., onto pallet 22. The size, shape and characteristics of robot path 46 may vary, e.g., depending upon where the object 44 is found at the first location, and depending on where the second location is, for example, and in some embodiments, depending on the location of any intervening object(s) and/or other parameters.

Vision system 16 includes cameras 48 and 50, which are used to obtain images of objects 44 to be picked up from conveyor 20, and to obtain images of pallet 22, for use in picking objects 44 and depositing the objects 44 in appropriate locations on pallet 22. The output of cameras 48, 50 may be processed by a computer (not shown, e.g., part of vision system 16), and provided to robotic controller 14, e.g., including an object 44 location for picking, and the location of pallet 22 and objects 44 deposited thereon, for use in directing robot 12 operations and motion to pick an object 44 and place it at a desired location on pallet 22. In one form, cameras 48 and 50 are constructed to provide 3-dimensional (3D) image data, e.g., in the form of a 3-D point cloud. In one form, each of cameras 48 and 50 are 3D cameras. In other embodiments, one or more of cameras 48 and 50 may be formed of two or more 2D cameras combined to generate 3D images. In other embodiments, 2D images may be employed. The number of cameras may vary with the needs of the application, and thus, various embodiments may have one or any other number of cameras.

In order to reduce loads on robot 12, e.g., on robot 12 drive motors, e.g., to increase robot life and reduce maintenance, and to increase gripper 34 life and reduce or prevent objects 44 from being damaged, it is desirable to control loads, e.g., dynamic loads while picking and translating an object from infeed conveyor 20 to pallet 22. Accordingly, some aspects of the present invention relate to systems and methods for analyzing the loads (e.g., force and torque loads, and in some embodiments, momentum) applied to end effector 32 (e.g., gripper 34) and picked objects 44, e.g., in picking, palletizing and packing applications or other applications.

In robotic picking, palletizing and packing applications, a robot gripper, e.g., gripper 34, is used to pick, move and place one or more objects 44 onto pallet 22 (i.e., palletize the objects 44). The robot system integrator typically selects or designs the gripper based, for example, on the weight of the object to be picked up and palletized. However, loads, e.g., force and torque (moment) loads (and in some embodiments, momentum), applied to the robot gripper and objects gripped or held by the gripper vary with the motion of the robot. With previous processes, the system integrator typically estimates the loads based on the robot parameters such as the maximum robot speed, and based on the system integrator's experience in gripper selection and/or design.

After selecting or designing the gripper, the system integrator may then test the gripper. However, such processes may not employ robot motion parameters, e.g., speeds, that are consistent with a desired life of the robot and/or gripper, and may yield undesirably higher grip strength, which may promote damage to the objects 44. With some embodiments of the present invention, the system integrator identifies the maximum or peak loads (e.g., force and torque/moment) between gripper and the picked object from an offline robot program simulation. The simulation results may then be used to guide gripper selection and design. Also the simulation results may be used to tune the robot motion program parameters to reduce the maximum loads, e.g., to within predefined limits. In some embodiments, a simple robot testing program is automatically generated and used to test end effector 32/gripper 34 while gripping and carrying (i.e., in motion) object 44 along a test path that achieves the same maximum or peak loads within the predefined limits, e.g., the loads on and between effector 32/gripper 34 and object 44, that are anticipated during production operations, e.g., after having been tuned during offline simulation to be within predefined limits. The testing may be performed, for example, using robot 12.

Figure 2:
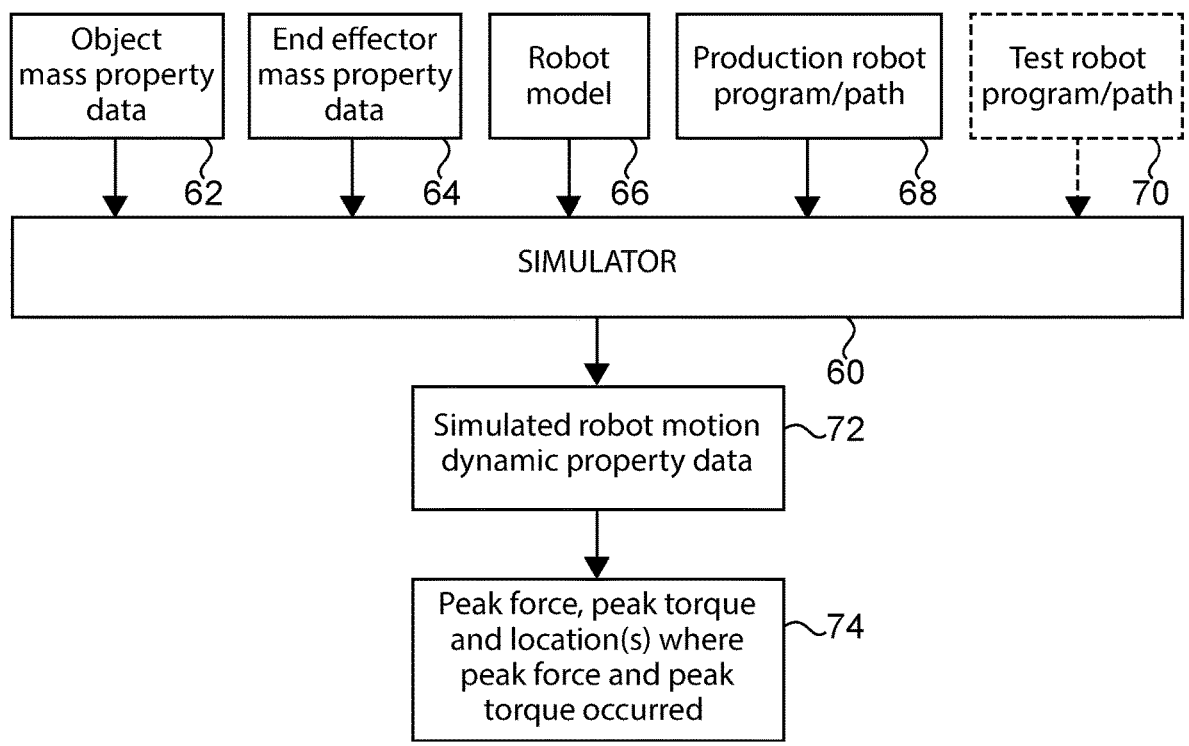
FIG. 2 schematically illustrates some aspects of a non-limiting example of a robotic simulation in accordance with an embodiment of the present invention.

Referring to FIG. 2, some aspects of a non-limiting example of a robotic simulation are schematically illustrated in accordance with an embodiment of the present invention. In one form, a simulator 60 is used to perform offline simulations of robot 12 motion, wherein "offline" refers to the fact that the simulation does not involve performing actual or real-world robotic movement/motions, but rather, performing a simulation, e.g., a software simulation, of robotic movement/motions. Simulator 60 may be or include, for example, a computer having loaded thereon an executable robot simulation program, and may include one or more displays, which may be 2D and/or 3D displays, and/or may display on a virtual reality and/or augmented reality headset.

In some embodiments, mass property data 62 for object 44 and mass property data 64 for end effector 32, e.g., for gripper 34, is imported into simulator 60, e.g., loaded into the simulation software operating on simulator 60. Also, a robot model 66, e.g., an electronic model of robot 12, is imported into simulator 60. Additionally, in some embodiments, a production robot program 68 is generated or created, and is imported into simulator 60. The production robot program 68 may be, for example, a palletizing robot program. A robot program defines the instructions that control the motion, e.g., speed and direction of movement, and the actions of robot 12. The production robot program 68 defines, among other things, the path of robot 12 during production activities, i.e., the production robot path. In some embodiments, a test robot program 70 is generated or created, and is imported into simulator 60. The test robot program 70 defines, among other things, the path of robot 12 during testing activities, i.e., a test robot path, such as a test robot path 47 illustrated in FIG. 1. In some embodiments, the test robot program may be all or a portion of the production robot program, e.g., portions where high forces and/or high torque/moment (and/or high momentum in some embodiments) are expected or observed, e.g., via testing or simulation. In some embodiments, the test robot program may be a robot program constructed to yield force/torque/momentum load generation that is similar to the force/torque/momentum load generation for all or one or more portions of the production robot program/production robot path. In other embodiments, the test robot program may be determined based on other parameters.

An offline simulation may be performed. The output of simulator 60 from the offline simulation includes, among other things, simulated robot motion dynamic property data 72, e.g., including linear velocity, linear acceleration, angular velocity and angular acceleration, among other things. The robot motion dynamic property data 72 includes, and may be analyzed to determine, data such as the maximum or peak force and maximum or peak torque (and in some embodiments the maximum or peak momentum) between end effector 32, e.g., gripper 34, and object 44, and the section of or location on the robotic path where the maximum or peak force and maximum or peak torque (and in some embodiments the maximum or peak momentum) occurred, illustrated as block 74.

In some embodiments, the simulated robot motion dynamic property data 72 from the offline simulation is recorded. The force and torque between end effector 32 or gripper 34 and the gripped object 44 (and in some embodiments, the momentum, e.g., of end effector 32 or gripper 34 and/or object 44) are then calculated. In some embodiments, the location, e.g., the section of the robot path where the maximum/peak force and torque is determined. In some embodiments, the locations or sections where the force and torque (and in some embodiments momentum) exceed a predefined limit are determined. The force and torque (and in some embodiments momentum) along robot path 46 may be displayed, e.g., in 2D and/or 3D, and the force and torque along robot path 46 may then be scanned to identify the maximum/peak of the force and torque (and in some embodiments momentum) along the robot path 46.

Changes may then be recommended on the motion program line of the robot path where the maximum/peak force and torque (and in some embodiments momentum) occurred, for example, those location(s) where the force, torque and in some embodiments momentum above predetermined force/torque/momentum limits were observed. The recommended changes may be, for example, to reduce acceleration, reduce speed, change the physical location of one or more portions of the path, etc. The changes may be recommended by a human, such as the robot system integrator, or may be recommended by an intelligent system, e.g., the simulation software or another software system.

In some embodiments, a test robot program is generated, e.g., automatically. The test robot program may be configured to test end effector 32 (e.g., gripper 34) and object 44 with the maximum load within the predefined limit, i.e., maximum load or a reduced maximum load (e.g., reduced by use of the tuning described herein) that is within the predefined limit(s). For example, in some embodiments, testing is performed with the same maximum force and torque (and in some embodiments momentum) between end effector 32 and object 44 identified in the offline simulation or identified and reduced through tuning in the offline simulation. The actual robot 12 motion dynamic property data (e.g., including linear velocity, linear acceleration, angular velocity and angular acceleration, among other things), e.g., obtained while running the test robot program (e.g., along the test robot path, such as test robot path 47), is recorded. The force and torque (and in some embodiments momentum) along the test robot path may be analyzed to identify the occurrence(s) and location(s) of maximum force and torque (and in some embodiments momentum) along the test program path. The peak force and torque (and in some embodiments momentum) may be updated or reduced to within the predefined force and torque (and in some embodiments momentum) limits for tuning the robot program/path parameters. In some embodiments, the maximum force and torque (and in some embodiments momentum) (e.g., in some embodiments, the reduced peak or maximum force and/or torque and/or momentum after tuning/reducing/updating the loads to bring them within the predefined limits) and their history results may be used in robot arm and end effector 32 (e.g., gripper 34) design and/or lifespan estimation.

Figure 3:
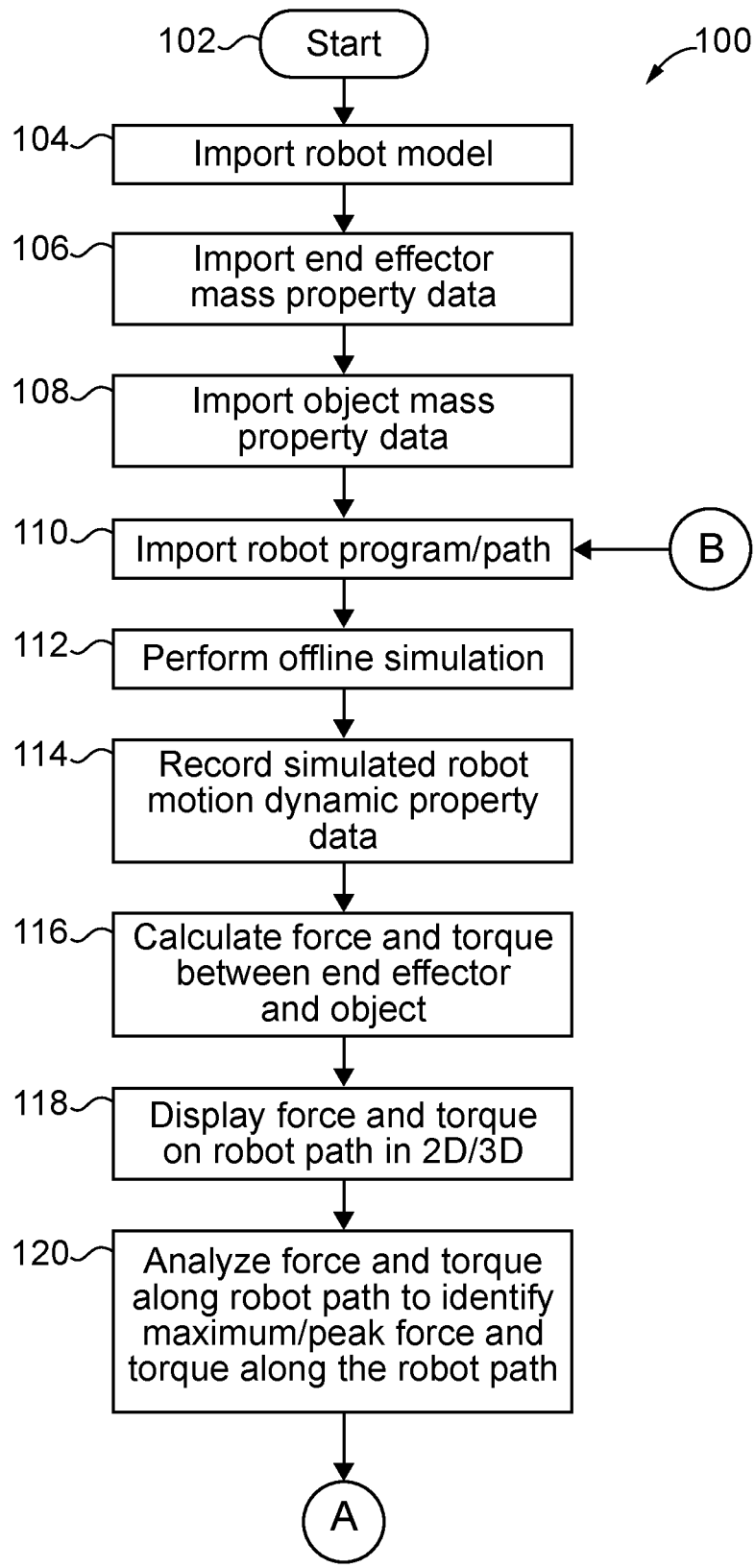
FIG. 3 is a flowchart depicting some aspects of a non-limiting example of a method for operating a robot in accordance with an embodiment of the present invention.

Referring to FIG. 3, a flowchart 100 depicts some aspects of a non-limiting example of a method for operating a robot in accordance with an embodiment of the present invention. The method includes a method for analyzing maximum/peak force and torque, and in some embodiments momentum. Process flow begins at block 102. At block 104, robot model 66 is imported into simulator 60, e.g., an electronic model of robot 12.

At block 106, mass property data for end effector 32, e.g., gripper 34, is imported into simulator 60. The mass property data includes, for example, weight, center of gravity, and inertia.

At block 108, mass property data for object 44 is imported into simulator 60. The mass property data includes, for example, weight, center of gravity, and inertia.

At block 110, production robot program/path 68 is imported into simulator 60. The production robot program defines a production robot path, e.g., robot path 46, and hence is referred to as a production robot program/path.

At block 112, an offline simulation is run on simulator 60 using robot model 66, the end effector 32 and object mass property data 62 and 64, and production robot program/path 68. The offline simulation simulates the operation of robot 12 gripping an object 44, transporting the object 44 along robot path 46, and depositing the object 44 onto pallet 22. The offline simulation generates, among other things, robot motion dynamic property data, e.g., for end effector 32 (e.g., gripper 34) and object 44. The robot motion dynamic property data includes, among other things, linear velocity, linear acceleration, angular velocity and angular acceleration.

Figure 4:
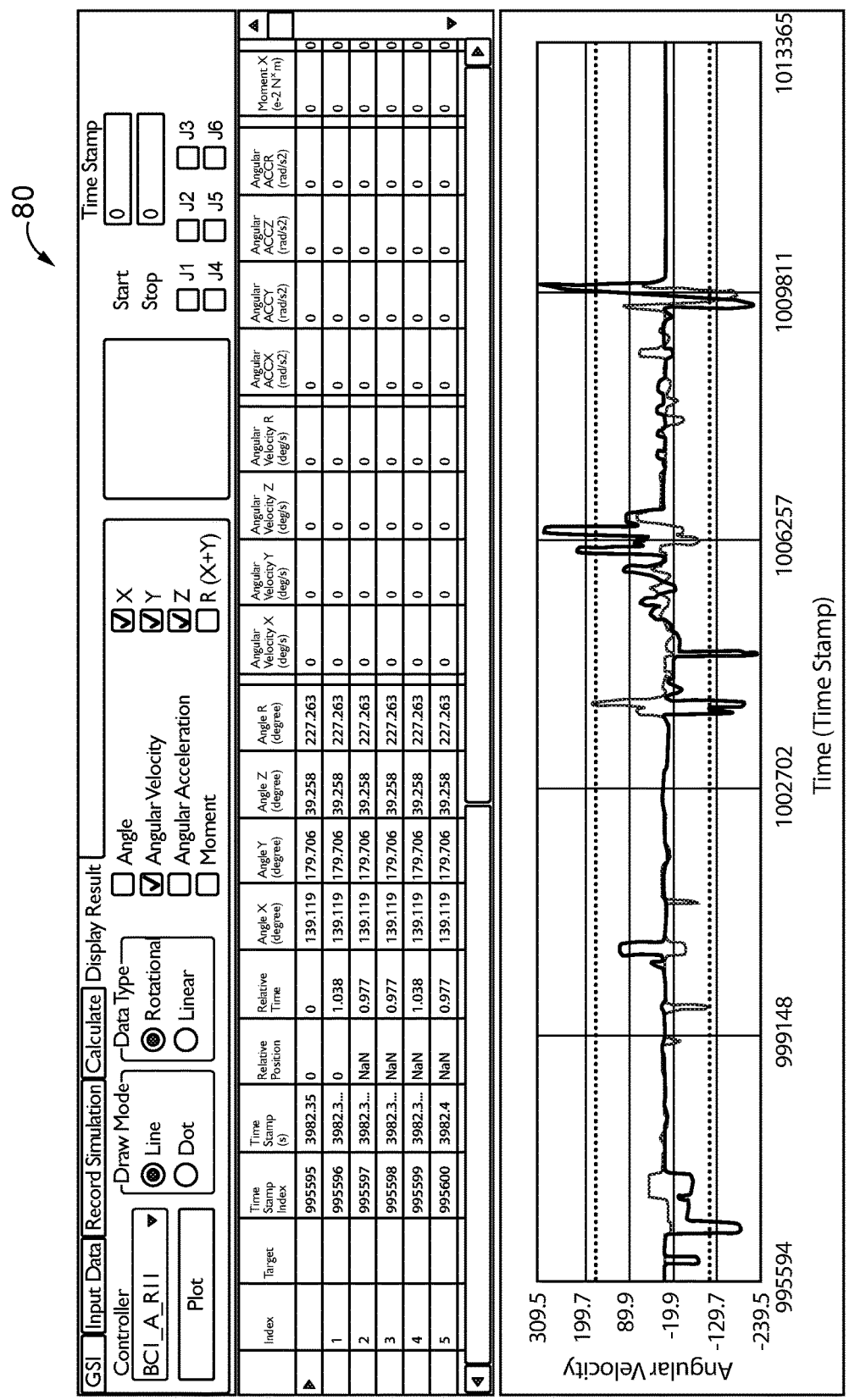
FIG. 4 illustrates some aspects of a non-limiting example of a recording of simulated robot motion dynamic property data in the form of recorded angular velocity, in accordance with an embodiment of the present invention.

At block 114, the simulated robot motion dynamic property data is recorded. FIG. 4 illustrates some aspects of a non-limiting example of a recording of simulated robot motion dynamic property data 80 in the form of recorded angular velocity in accordance with an embodiment of the present invention.

At block 116, the force and torque (or moment) (and in some embodiments momentum) between end effector 32 (e.g., gripper 34) and object 44 are calculated, e.g., based at least in part on the simulated robot motion dynamic property data generated by and recorded from the offline simulation, and based on gravity loading. In some embodiments, momentum is also calculated. The force and torque (and in some embodiments momentum) are calculated along robot path 46, e.g., continuously or at discrete points along robot path 46.

Figure 5:
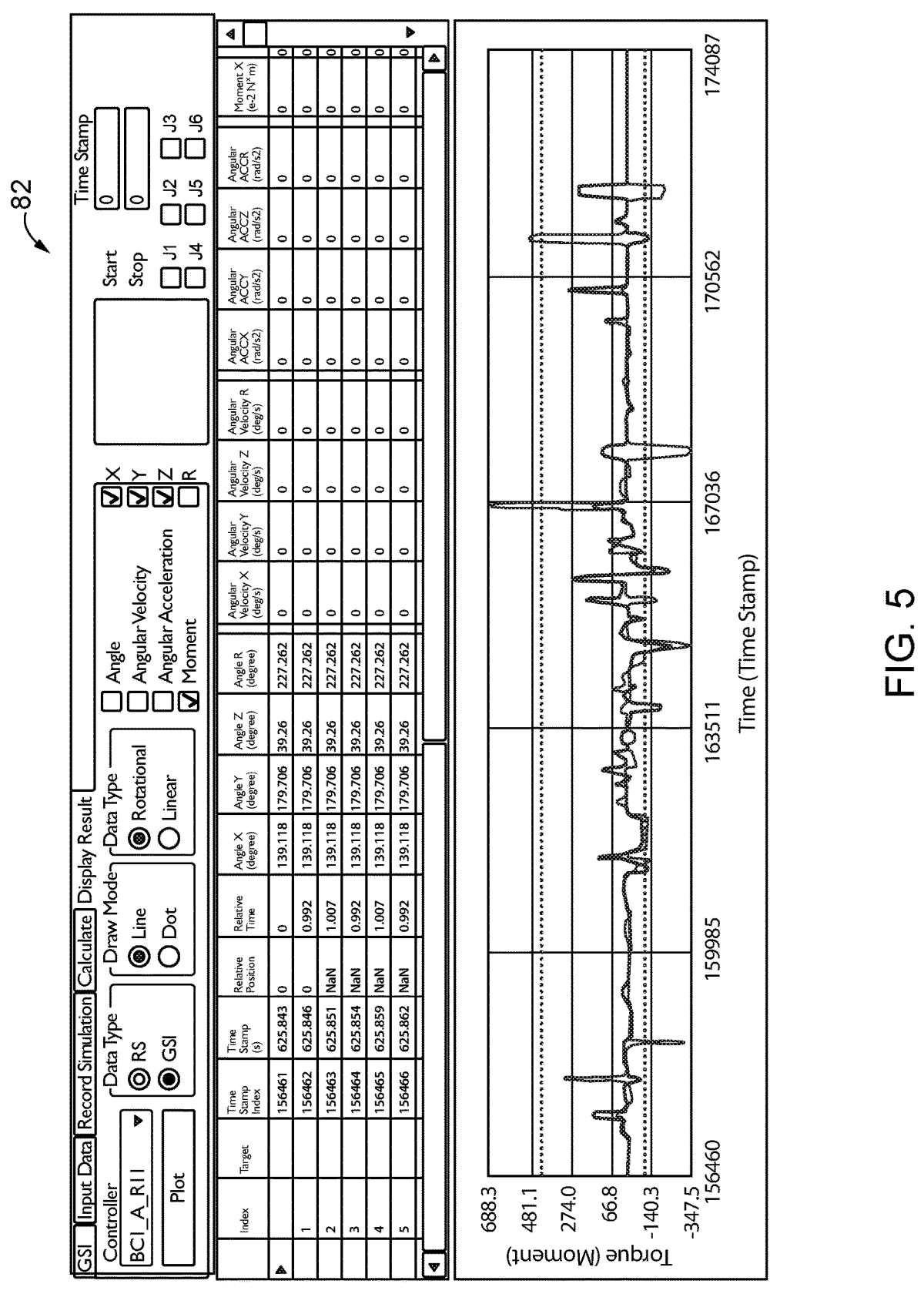

At block 118, the calculated force and torque/moment between end effector 32 (e.g., gripper 34) and object 44 (and in some embodiments momentum) along the production robot path, e.g., robot path 46, are displayed. The force and torque/moment (and in some embodiments momentum) may be displayed in 2D and/or 3D form. FIG. 5 illustrates some aspects of a non-limiting example of a 2D display of the calculated torque/moment 82 along robot path 46.

At block 120, the force and torque, and in some embodiments the momentum, are analyzed to identify the maximum/peak of the force, torque, and in some embodiments momentum along the path. In some embodiments, this includes identifying the section(s) along the path where the maximum/peak force, torque and in some embodiments momentum occurred. The locations of the maximum/peak of the force, torque and momentum may not be the same. For example, the maximum/peak force may be located in a different section of the production robot path than the maximum/peak torque. The results may be displayed in the simulation program, and can be shown in 2D plot or 3D view. These results may be used by the robot system integrator or robot programmer to tune the production robot program parameters, e.g., to control the speed and acceleration in order to control the loads on or between the end effector 32 (e.g., gripper 34) and the object 44.

Figure 6:
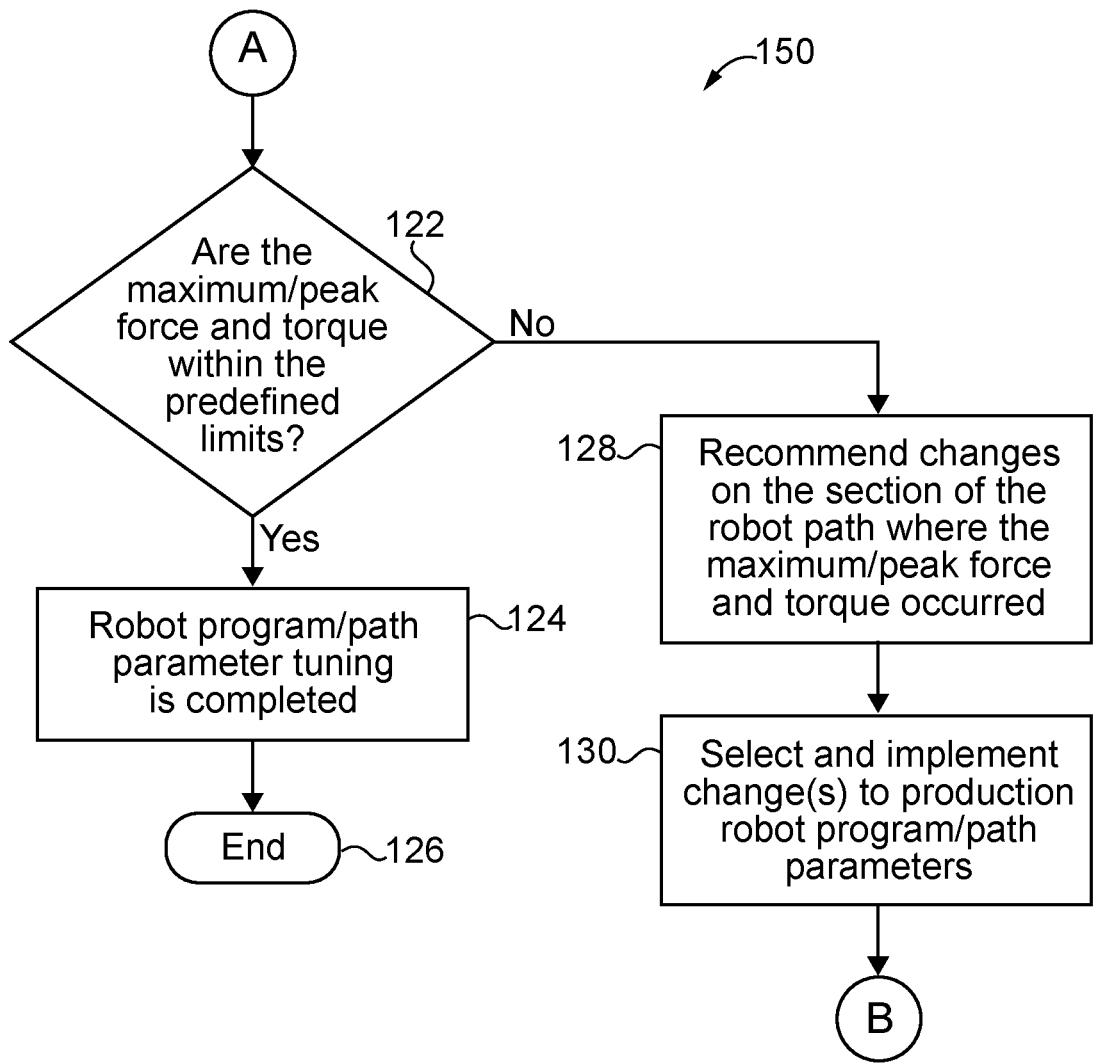
FIG. 6 is a flowchart depicting some aspects of a non-limiting example of a method for operating a robot in accordance with an embodiment of the present invention.

Referring to FIG. 6 in conjunction with FIG. 3, some aspects of a non-limiting example of a method for operating a robot in accordance with an embodiment of the present invention is illustrated in the form of a flowchart 150. The method includes a method for tuning production robot program parameters. In some embodiments, the method of FIG. 6 includes or is based on the method illustrated in FIG. 3. The method of FIG. 6 may be employed to control the maximum/peak force, torque and in some embodiments momentum to within predefined limits, e.g., to reduce the maximum/peak force, torque (and in some embodiments momentum) at all locations on production robot path 46 to be within the predefined limits. For example, for all locations where the force, torque and in some embodiments momentum exceed the predefined limits, changes, e.g., reduced robot speed, may be implemented so that the force/torque/momentum at all such locations is reduced to being within the predefined limits.

Process flow begins at block 122, e.g., after having analyzed the loads, e.g., force and torque (and in some embodiments momentum) to identify the maximums/peaks along the production robot path 46 at block 120 of FIG. 3. At block 122, a determination is made as to whether the maximum/peak force and torque (and in some embodiments momentum) values along the robot path are within the predefined limits. If so, the production robot program/path parameter tuning is considered complete at block 124, and process flow ends at block 126. If not, process flow proceeds to block 128.

At block 128, changes to the production robot program and/or path, e.g., production robot program/path 68 are recommended, e.g., to reduce the acceleration, speed and/or other parameters on the section of the production robot path 46 where the peak force and torque (and in some embodiments momentum) occurred. The changes may be recommended by a human, such as the robot system integrator, or may be recommended by an intelligent system, e.g., the simulation software or another software system.

At block 130, changes to the production robot program/path are selected, and implemented. For example, production robot program/path 68 is modified by incorporating one or more production robot program/path 68 parameter changes into production robot program/path 68. The changes are implemented, for example, to reduce the maximum/peak loads, e.g., force and torque between the gripper 34 and object 44 (and in some embodiments to reduce momentum, e.g., of object 44). Process flow then proceeds to block 110 of FIG. 3, wherein the modified production robot program/path 68 is imported into simulator 60 software. The process of blocks 110-130 is repeated until each maximum/peak force and torque (and in some embodiments momentum) is reduced to being within the predefined limits. For example, in a first pass, the maximum/peak load at a particular location along the robot path may exceed the predefined limit and be reduced. After this point the next lowest maximum/peak, e.g., at a different location along the robot path, will be compared to the predefined limits, and if greater than the predefined limits, changes to the production robot program/path parameters will be made, and so on, until the loads (e.g., force, torque and/or in some embodiments, momentum) along the robot path are within the predefined limits.

After tuning the robot program parameters to reduce the maximum/peak of the force, torque and momentum to within limits (e.g., via the methodology illustrated in FIGS. 3 and 6), the system may generate a robot program to test end effector 32/gripper 34 with same maximum force and torque between end effector 32/gripper 34 and object 44 (and in some embodiments, momentum) identified from the offline simulation. The robot system integrator can easily and quickly test robot 12 with end effector 32/gripper 34 gripping an object 44 that the palletizing system is constructed to be able to handle. In some embodiments, production robot program/path 68 with the tuned production robot program/path parameters may be uploaded onto robot controller 14, e.g., in order to operate robot 12 to perform production tasks. The tasks may be or include, for example, picking objects 44 from infeed conveyor 20, and transporting the objects 44 to and depositing the objects 44 on pallet 22.

Figure 7:
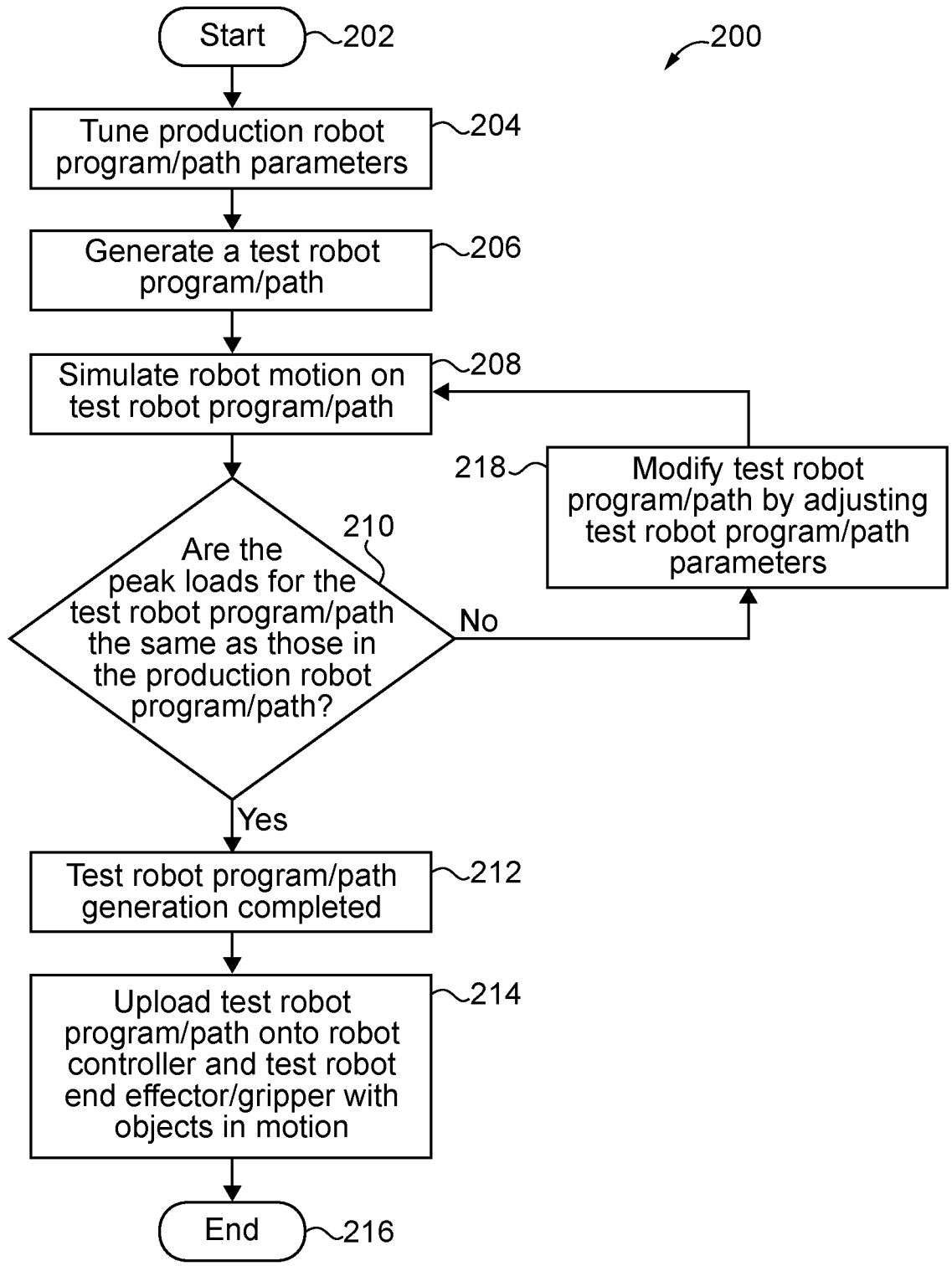
FIG. 7 is a flowchart depicting some aspects of a non-limiting example of a method for operating a robot in accordance with an embodiment of the present invention.

Referring to FIG. 7 in conjunction with FIG. 3, some aspects of a non-limiting example of a method for operating a robot in accordance with an embodiment of the present invention is illustrated in the form of a flowchart 200. In some embodiments, the method of FIG. 7 includes or is based on the method illustrated in FIGS. 3 and 6. The method of FIG. 7 may be employed to generate a test robot program for testing robot 12 with end effector 32/gripper 34 gripping object 44 and transporting object 44 along a test robot path, e.g., test robot path 47 with the loads (e.g., the maximum/peak force, torque and in some embodiments momentum) that are projected to occur after the tuning process of FIGS. 3 and 6. Process flow begins at block 202.

At block 204, the production robot program/path parameters are tuned, e.g., by using the methodology of and described with respect to FIGS. 3 and 6.

At block 206, a test robot program/path, e.g., test robot program/path 70, is generated. In one form, the test robot program/path 70 is generated automatically. For example, in some embodiments, program instructions configured for automatically generating test robot program/path 70 may be stored in a computer memory or a non-transitory computer readable storage medium accessible to the computer. A processor of the computer may execute the program instructions to generate test robot program/path 70. Test robot program/path 70 is configured for testing end effector 32/gripper 34 while gripping an object 44, in motion, with the maximum/peak loads within the predefined limits, e.g., as determined and tuned the process of FIGS. 3 and 6. The computer that executes the program instructions to generate test robot program/path 70 may be, for example, controller 14, simulator 60 or one or more computers associated with simulator 60, and/or any other suitable computer(s). In some embodiments, the test robot program/path 70 may alternatively be generated manually, e.g., by the robot programmer or robot system integrator.

In one form, test robot program/path 70 is configured and constructed to move robot 12 (or another robot, e.g., a test robot), with end effector 32/gripper 34 gripping object 44, along a path that generates the same maximum/peak loads on end effector 32/gripper 34 and object 44 as in production robot/path 68 after the production robot program/path parameters have been tuned, which, for example, may be less than the maximum/peak loads prior to tuning. In some embodiments, test robot program/path 70 is configured and constructed to generate the maximum/peak loads (e.g., force, torque and in some embodiments momentum) at the same sections of the path or the same physical locations as where the maximum/peak loads occur in the production robot program/path. In one form, test robot program/path is relatively simple, e.g., compared to production robot program/path 68. In some embodiments, test robot program/path 70 may be the same as all or a portion of the production robot program/path 68.

At block 208, test robot program/path 70 is executed on simulator 60 to simulate robot 12 motion on test robot program/path 70, i.e., to perform an offline simulation using test robot program/path 70.

At block 210, a determination is made based on the offline simulation as to whether the maximum/peak loads in the offline simulation of test robot program/path 70 are the same as those that occurred in the offline simulation of production robot program/path 68. In some embodiments, this includes determining whether the location(s) along a robot path where the maximum/peak loads occur is the same for both the test robot program/path 70 and production robot program/path 68. If so, at block 212, the test robot program/path generation is considered to have been completed. At block 214, test robot program/path 70 is uploaded onto controller 14, and end effector 32/gripper 34 gripping and carrying object 44 (i.e., in motion) is physically tested using robot 12, i.e., an online test using robot 12 is performed. Process flow ends at block 216. If the maximum/peak loads in the offline simulation of test robot program/path 70 are not the same as those that occurred in the offline simulation of production robot program/path 68, process flow proceeds to block 218.

At block 218, the test robot program/path parameters are adjusted in order to render the maximum/peak loads (and in some embodiments, the locations of such loads) of test robot program/path 70 to be the same as those that occurred in the offline simulation of production robot program/path 68, after which process flow proceeds to block 208. The actions of blocks 208, 210 and 218 are repeated until the maximum/peak loads (and in some embodiments, the locations of such loads) identified using test robot program/path 70 are the same as those that occurred in the offline simulation of production robot program/path 68, e.g., as identified at block 120 of FIG. 3.

Once the test robot program/path 70 is completed, actual robot 12 testing using test robot program/path 70 may be performed. The system, e.g., running on simulator 60, can record the actual robot motion dynamic property data (e.g., linear velocity, linear acceleration, angular velocity, angular acceleration) in the test run. The force and torque between end effector 32/gripper 34 (and in some embodiments, momentum, e.g., of the object 44 gripped by end effector 32/gripper 34) along the test robot path can be analyzed to identify the maximum force and torque along the test program path. The system can update/reduce the peak force and torque to within the predefined limits for tuning the robot program/path parameters.

Figure 8:
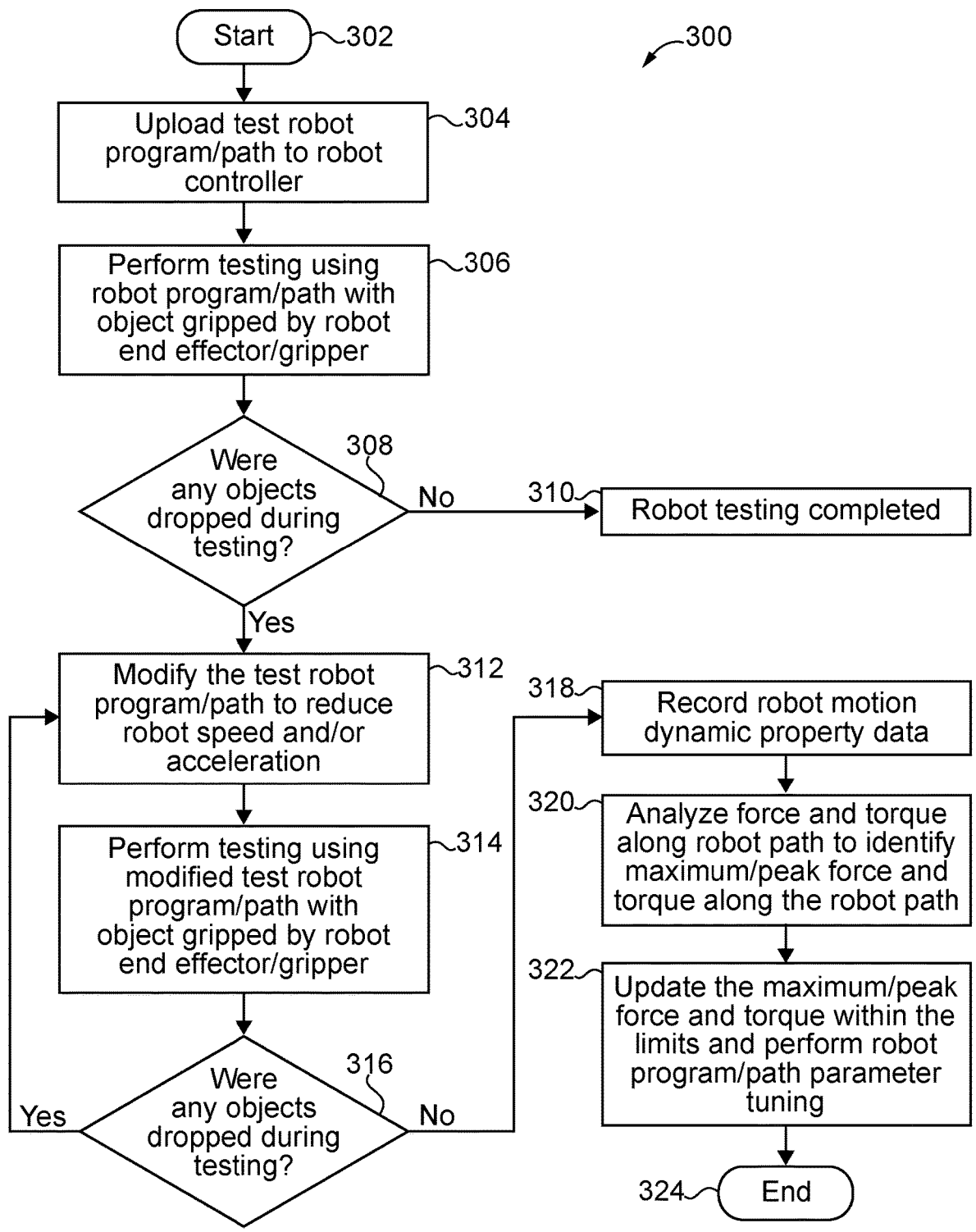
FIG. 8 is a flowchart depicting some aspects of a non-limiting example of a method for operating a robot in accordance with an embodiment of the present invention.

Referring to FIG. 8 in conjunction with FIGS. 3, 6 and 7, some aspects of a non-limiting example of a method for operating a robot in accordance with an embodiment of the present invention is illustrated in the form of a flowchart 300. In some embodiments, the method of FIG. 8 includes or is based on all or part of one or more of the methods illustrated in FIGS. 3, 6 and 7. The method of FIG. 8 may be employed to run the test robot program/path for testing robot 12 with end effector 32/gripper 34 gripping object 44 and transporting object 44 along the test robot path with the loads (e.g., the maximum/peak force, torque and in some embodiments momentum) that are projected to occur after the tuning process of FIGS. 3 and 6. The test robot path, e.g., test robot path 47, may be, for example, all or part of production robot path 46. In some embodiments, the test robot path may be, or may be based on, for example, robot motion configured to obtain loads similar to those obtained along robot path 46 using production robot program/path 68. Process flow begins at block 302.

At block 304, test robot program/path 70 is uploaded into controller 14.

At block 306, online testing is performed on robot 12 using test robot program/path 70, i.e., physical or real-world testing (not simulation) is performed. During the testing, robot 12 grips an object 44 using end effector 32/gripper 34 and transports the object 44 along the test robot path.

At block 308 a determination is made as to whether any objects 44 were dropped during the testing. If not, robot testing is considered complete at block 310. If so, process flow proceeds to block 312.

At block 312, the test robot program/path 70 is modified to reduce robot speed and/or acceleration/deceleration.

At block 314, testing is performed using the modified test robot program/path. During the testing, robot 12 grips an object 44 using end effector 32/gripper 34 and transports the object 44 along the test robot path.

At block 316 a determination is made as to whether any objects 44 were dropped during the testing with the modified test robot program/path 68. If so, process flow proceeds to block 32 wherein the test robot program/path is modified to further reduce robot speed and/or acceleration, and testing is again performed at block 314. The process of blocks 312-316 is repeated until no objects 44 are dropped during testing. If no objects 44 were dropped during the testing with reduced speed and/or acceleration, process flow proceeds to block 318.

At block 318, robot motion dynamic property data (e.g., linear velocity, linear acceleration, angular velocity and angular acceleration) is recorded. For example, the robot motion dynamic property data may be recorded while transporting an object 44 along the test robot path using end effector 32/gripper 34.

At block 320, the force and torque between end effector 32/gripper 34 and object 44 (and in some embodiments momentum, e.g., of object 44 and/or end effector 32/gripper 34) are analyzed to identify the maximum/peak of the force and torque (and in some embodiments momentum) along the test robot path, e.g., test robot path 47.

At block 322, the maximum/peak force and torque within the predefined limits is updated, e.g., in production robot program/path 68, and production robot program/path tuning is performed, e.g., as illustrated in and described with respect to FIGS. 3 and 6. Once completed, the maximum or peak force, torque (and in some embodiments, momentum) along the robot path, e.g., production robot path 46, and production robot program/path 68 is ready for use during production. Process flow then ends at block 324.

In some embodiments, e.g., set forth above, a simple robot testing program may be automatically generated from or based on the complicated robot program/path that is intended for production use. The simple robot testing program/path is configured to achieve the maximum or peak loads between end effector 32/gripper 34 and object 44, e.g., peak force and torque and in some embodiments momentum, that were estimated during offline simulation. In some embodiments, the robot program/path is tuned during the offline simulation so that the maximum or peak loads are within predefined limits. The automatically generated simple robot testing program/path includes robot movements or motion that yield the maximum or peak loads within the predefined limits. The automatically generated simple test program is used, for example, to test end effector 32/gripper 34 while gripping and carrying an object 44 on or along a test path that achieves the maximum or peak loads within the predetermined limits. This allows the system integrator to test anticipated maximum or peak loads on end effector 32/gripper 34 while gripping and carrying object 44, in a simple manner, without waiting until the robot cell is built and testing is performed on the full and more complicated production robot program/path. The robot end effector/gripper designer and builder can use this simple robot testing to validated, for example, the gripper capability to handle anticipated loads, e.g., the maximum or peak loads, which is an important end effector/gripper design consideration, when designing a vacuum cup gripper to pick up and transport an object along a path, such as along production path 46.

Some embodiments reduce the engineering time and cost to select or design the end effector or gripper; reduce engineering time to tune robot program parameters for reducing cycle time, without dropping objects; reduce the time required for testing the end effector/gripper; improve the robustness of the production robotic system, e.g., a robotic palletizing system; protect fragile objects by limiting the maximum force applied; and simplify the selection of end effector/gripper.

Embodiments of the present invention include a method for operating a robot, comprising: creating a production robot program for execution on a robotic controller during robotic production, wherein the robot program defines a robot path; performing an offline simulation of robot motion along the robot path using the production robot program; analyzing loads between a robot end effector and an object sought to be gripped by the robot end effector and held by the end effector and transported by the end effector along the robot path, based on the offline simulation, to identify a maximum load experienced during the simulation; tuning production robot program parameters to reduce the maximum load if the maximum load is not within a predefined limit; generating a test robot program to test the end effector and the object with the maximum load within the predefined limit; testing the end effector with the object online using the test robot program; repeating the tuning and testing until no objects are dropped during the testing; and operating the robot during production using tuned robot program parameters to pick objects up from a first location and deposit the objects at a second location.

In a refinement, the method further comprises incorporating into the offline simulation a robot model, first mass property data for the end effector and second mass property data for the object, wherein the offline simulation generates robot motion dynamic property data.

In another refinement, the method further comprises calculating loads between the end effector and the object along the robot path.

In yet another refinement, the method further comprises determining whether the maximum load is within the predefined limit.

In still another refinement, the tuning includes selecting and implementing changes in production robot program parameters for a section of the path where the maximum load occurred, wherein the changes are selected to reduce the maximum load; and modifying the production robot program using the changes.

In yet still another refinement, the method further comprises determining whether the maximum loads occurring with the production robot program are the same as the peak loads occurring with the test robot program.

In a further refinement, the method further comprises adjusting test robot program parameters if the maximum loads and the peak loads are not the same.

In a yet further refinement, the method further comprises determining whether any objects were dropped while performing the testing.

Embodiments of the present invention include a method for operating a robot, comprising: importing a production robot program into a robot simulation module; importing mass property data into the robot simulation module for a robot end effector and an object to be gripped by the end effector during production; performing an offline simulation of robot motion along a robot path using the robot program and the robot simulation module, wherein the simulated robot motion includes a simulation of picking the object up from a first location using the robot end effector and depositing the object at a second location; analyzing loads between the robot end effector and the object to be gripped by the robot end effector and transported by the end effector along the robot path, based on the offline simulation, to identify a maximum load experienced during the simulation; determining whether the maximum load is within a predefined limit; tuning parameters of the robot program/path if the load was not within the predefined limit; and operating the robot using tuned program parameters to pick objects up from the first location and deposit the objects at the second location.

In a refinement, the method further comprises generating a test robot program to test the robot end effector with the maximum load within the predefined limit; performing an offline simulation of robot motion using the test robot program; determining whether a peak load occurring using the test robot program is the same as the maximum load; and adjusting test robot program parameters if the peak load is not the same as the maximum load.

In another refinement, the method further comprises running the test robot program on the robot controller to perform a test using the robot along a test robot path.

In yet another refinement, the method further comprises determining whether the object was dropped while running the test robot program, wherein the test is complete if the object was not dropped.

In still another refinement, the method further comprises modifying the test robot program to reduce robot speed; and determining whether the object was dropped while running the test at the reduced speed.

In yet still another refinement, if the object was not dropped while running the test at the reduced robot speed, the method further comprises analyzing the loads between the robot end effector and the object at the reduced robot speed; updating the maximum load within the predefined limit; and again tuning parameters of the robot program/path based on the reduced robot speed.

In a further refinement, the method further comprises modifying the test robot program to further reduce the speed if the object was dropped while running the test at the reduced robot speed.

Embodiments of the present invention include a method for operating a robot, comprising: importing a production robot program into a robot simulation module; performing an offline simulation of robot motion along a robot path using the production robot program and the robot simulation module, wherein simulated robot motion includes picking the object up from a first location using a robot end effector and depositing the object at a second location; recording simulated robot motion dynamic property data from the offline simulation; identifying a maximum load experienced during the simulation and a section of the robot path where the maximum load occurred; determining whether the maximum load is within a predefined limit; tuning parameters of the production robot program to reduce the maximum load if the load was not within the predefined limit; and operating the robot using tuned production robot program parameters to pick objects up from a first location and deposit the objects at a second location.

In a refinement, the method further comprises running an offline simulation of a test robot program to simulate robot motion on a test robot path; determining whether a peak load occurring using the test robot program is the same as the maximum load; and adjusting test robot program parameters if the peak load is not the same as the maximum load.

In another refinement, the method further comprises running the test robot program on the robot controller to perform a test using the robot along a test robot path.

In yet another refinement, the method further comprises determining whether the object was dropped while running the test, wherein the test is complete if the object was not dropped.

In still another refinement, if the object was dropped while running the test, the method further comprises: modifying the test robot program/path to reduce robot speed on at least part of the test robot path; and determining whether the object was dropped while running the test at the reduced speed.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for operating a robot, comprising:
    creating a production robot program for execution on a robotic controller during robotic production, wherein the production robot program defines a robot path;
    performing an offline simulation of robot motion along the robot path using the production robot program;
    analyzing loads between a robot end effector and an object sought to be gripped by the robot end effector and held by the end effector and transported by the end effector along the robot path, based on the offline simulation, to identify a maximum load experienced during the simulation;
    tuning production robot program parameters to reduce the maximum load if the maximum load is not within a predefined limit;
    generating a test robot program to test the end effector and the object with the maximum load within the predefined limit, the test robot program defining a test path for movement of the robot, at least a portion of the test path being different than the robot path of the production robotic program;
    testing the end effector with the object online using the test path of the test robot program;
    modifying parameters of the test robot program until no objects are dropped during the testing; and
    updating the production robot program using the modified parameters of the test robot program to operate the robot to pick objects up from a first location and deposit the objects at a second location.

2. The method of claim 1, further comprising incorporating into the offline simulation a robot model, first mass property data for the end effector and second mass property data for the object, wherein the offline simulation generates robot motion dynamic property data.

3. The method of claim 1, further comprising calculating loads between the end effector and the object along the robot path.

4. The method of claim 1, further comprising determining whether the maximum load is within the predefined limit.

5. The method of claim 1, wherein the tuning includes selecting and implementing changes in production robot program parameters for a section of the robot path where the maximum load occurred, wherein the changes are selected to reduce the maximum load; and modifying the production robot program using the changes.

6. The method of claim 1, further comprising determining whether the maximum loads occurring with the production robot program are the same as the peak loads occurring with the test robot program.

7. The method of claim 1, wherein modifying parameters of the test robot program comprises adjusting parameters of the test robot program so peak loads occurring with the test robot program are the same as the maximum loads occurring with the production robot program.

8. The method of claim 1, further comprising determining whether any objects were dropped while performing the testing, and testing the end effector with the object online using the test path of the test robot program.

9. A method for operating a robot, comprising:
    importing a production robot program into a robot simulation module;
    importing mass property data into the robot simulation module for a robot end effector and an object to be gripped by the end effector during production;
    performing an offline simulation of robot motion along a robot path using the production robot program and the robot simulation module, wherein the simulated robot motion includes a simulation of picking the object up from a first location using the robot end effector and depositing the object at a second location;
    analyzing loads between the robot end effector and the object to be gripped by the robot end effector and transported by the end effector along the robot path, based on the offline simulation, to identify a maximum load experienced during the simulation;
    determining whether the maximum load is within a predefined limit;
    tuning parameters of the robot program/path if the maximum load was not within the predefined limit;
    generating a test robot program to test the end effector and the object with the maximum load, as identified during the simulation of the production robot program and which is within the predefined limit;
    testing the end effector with the object using the test robot program;
    determining whether a peak load occurring with the test robot program is the same as the maximum load experienced during the simulation;
    adjusting, if the peak load is not the same as the maximum load, parameters of the test robot program so the peak load occurring with the test robot program is the same as the maximum load experienced during the simulation; and
    operating the robot using tuned program parameters to pick objects up from the first location and deposit the objects at the second location.

10. The method of claim 9, wherein testing using the test path of the test robot program comprises both offline testing and online testing of the test robot program.

11. The method of claim 9, further comprising running the test robot program on the robot controller to perform a test using the robot along a test robot path.

12. The method of claim 11, further comprising determining whether the object was dropped while running the test robot program, wherein the test is complete if the object was not dropped, and wherein at least a portion of the test robot path is different than the robot path of the production robot program.

13. The method of claim 12, further comprising:
modifying the test robot program to reduce robot speed; and
determining whether the object was dropped while running the test at the reduced speed.

14. The method of claim 13, wherein, if the object was not dropped while running the test at the reduced robot speed, the method further comprises analyzing the loads between the robot end effector and the object at the reduced robot speed; updating the maximum load within the predefined limit; and again tuning parameters of the robot program/path based on the reduced robot speed.

15. The method of claim 13, further comprising modifying the test robot program to further reduce the speed if the object was dropped while running the test at the reduced robot speed.

16. A method for operating a robot, comprising:
importing a production robot program into a robot simulation module;
performing an offline simulation of robot motion along a robot path using the production robot program and the robot simulation module, wherein simulated robot motion includes picking the object up from a first location using a robot end effector and depositing the object at a second location;
recording simulated robot motion dynamic property data from the offline simulation;
identifying a maximum load experienced during the simulation and a section of the robot path where the maximum load occurred;
determining whether the maximum load is within a predefined limit;
tuning parameters of the production robot program to reduce the maximum load if the load was not within the predefined limit;
generating a test robot program to test the end effector and the object with the maximum load, as identified during the simulation of the production robot program;
testing the end effector with the object using the test robot program;
determining whether a peak load occurring with the test robot program is the same as the maximum load experienced during the simulation;
adjusting, if the peak load is not the same as the maximum load, parameters of the test robot program so the peak load occurring with the test robot program is the same as maximum load; and
operating the robot using tuned production robot program parameters to pick objects up from a first location and deposit the objects at a second location.

17. The method of claim 16, wherein testing using the test robot program comprises running an offline simulation of the test robot program to simulate robot motion on a test robot path.

18. The method of claim 17, further comprising running the test robot program on a robot controller to perform an online test using the robot along the test robot path.

19. The method of claim 18, further comprising determining whether the object was dropped while running the online test, wherein the test is complete if the object was not dropped.

20. The method of claim 19, wherein if the object was dropped while running the online test, further comprising:
modifying the test robot program to reduce robot speed on at least part of the test robot path; and
determining whether the object was dropped while running the test at the reduced speed.

* * * * *